United States Patent
Dhondse et al.

(10) Patent No.: US 10,114,968 B2
(45) Date of Patent: Oct. 30, 2018

(54) PROXIMITY BASED CONTENT SECURITY

(71) Applicant: International Business Machines Corporation, Armonk, NY (US)

(72) Inventors: Amol A. Dhondse, Pune (IN); Anand Pikle, Pune (IN); Laura I. Rusu, Victoria (AU); Gandhi Sivakumar, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/047,907

(22) Filed: Feb. 19, 2016

(65) Prior Publication Data

US 2017/0243020 A1    Aug. 24, 2017

(51) Int. Cl.
| | |
|---|---|
| G06F 21/62 | (2013.01) |
| H04L 29/06 | (2006.01) |
| G06F 21/10 | (2013.01) |
| H04W 12/02 | (2009.01) |
| H04W 12/08 | (2009.01) |

(52) U.S. Cl.
CPC .......... *G06F 21/6218* (2013.01); *G06F 21/10* (2013.01); *G06F 21/62* (2013.01); *H04L 63/101* (2013.01); *H04L 63/102* (2013.01); *H04W 12/02* (2013.01); *H04W 12/08* (2013.01)

(58) Field of Classification Search
CPC ...... G06F 21/6218; G06F 21/10; G06F 21/62; G06F 63/101; H04L 63/101; H04L 63/102; H04W 12/02
See application file for complete search history.

(56) References Cited

U.S. PATENT DOCUMENTS

| | | | |
|---|---|---|---|
| 7,088,284 B2 | 8/2006 | Young | |
| 8,233,882 B2 * | 7/2012 | Rogel | G06F 21/31 |
| | | | 455/411 |
| 8,301,910 B2 * | 10/2012 | Perepa | G06F 21/10 |
| | | | 380/30 |
| 8,312,064 B1 * | 11/2012 | Gauvin | G06F 21/6218 |
| | | | 707/822 |
| 8,922,480 B1 * | 12/2014 | Freed | G09G 5/00 |
| | | | 345/156 |

(Continued)

OTHER PUBLICATIONS

A. Toninelli, R. Montanari and A. Corradi, "Enabling secure service discovery in mobile healthcare enterprise networks," in IEEE Wireless Communications, vol. 16, No. 3, pp. 24-32, Jun. 2009.*

(Continued)

*Primary Examiner* — Kari L Schmidt
(74) *Attorney, Agent, or Firm* — Cantor Colburn LLP; Louis Percello

(57) ABSTRACT

Embodiments include method, systems and computer program products for proximity based content security. Aspects include receiving a request to access a secured data by a user device; accessing, by a processor, a security profile for the secured data; obtaining environmental data from one or more sensors related to the user device, wherein a type of the one or more sensors is determined by the security profile; and providing access to the secured data based upon a determination that the environmental data is in compliance with the security profile.

17 Claims, 5 Drawing Sheets

(56) References Cited

U.S. PATENT DOCUMENTS

| | | | |
|---|---|---|---|
| 9,038,158 B1* | 5/2015 | MacKay | H04L 9/0872 709/225 |
| 9,100,440 B1* | 8/2015 | Manmohan | H04L 63/20 |
| 9,191,822 B2* | 11/2015 | Andersson | G06F 21/33 |
| 9,317,721 B2* | 4/2016 | Plagemann | G06F 21/82 |
| 9,367,705 B2* | 6/2016 | Ryerson | G06F 21/6245 |
| 9,712,565 B2* | 7/2017 | Cheng | H04L 63/20 |
| 2007/0118876 A1* | 5/2007 | Singh | G06F 21/36 726/2 |
| 2007/0143824 A1* | 6/2007 | Shahbazi | H04L 63/083 726/1 |
| 2008/0155268 A1* | 6/2008 | Jazayeri | G06F 21/32 713/186 |
| 2008/0157932 A1* | 7/2008 | Winkler | G06Q 10/06 340/10.6 |
| 2008/0284587 A1 | 11/2008 | Saigh et al. | |
| 2009/0012806 A1* | 1/2009 | Ricordi | G06F 3/03545 705/16 |
| 2009/0158441 A1* | 6/2009 | Mohler | G06F 21/552 726/27 |
| 2009/0249443 A1* | 10/2009 | Fitzgerald | H04L 63/10 726/2 |
| 2009/0253410 A1* | 10/2009 | Fitzgerald | G06F 21/88 455/411 |
| 2010/0203920 A1 | 8/2010 | Gregory | |
| 2012/0131685 A1* | 5/2012 | Broch | G06F 21/554 726/30 |
| 2012/0240220 A1* | 9/2012 | Smith | G06F 21/34 726/17 |
| 2012/0280902 A1 | 11/2012 | Persaud et al. | |
| 2012/0291133 A1* | 11/2012 | Nagpal | G06F 21/6218 726/26 |
| 2013/0047197 A1* | 2/2013 | Saroiu | G06F 21/6209 726/1 |
| 2013/0103810 A1* | 4/2013 | Papakipos | G06Q 50/01 709/221 |
| 2013/0263206 A1* | 10/2013 | Nefedov | G06F 21/6218 726/1 |
| 2014/0015595 A1 | 1/2014 | Van Ausdall et al. | |
| 2014/0040979 A1* | 2/2014 | Barton | H04L 63/20 726/1 |
| 2014/0201844 A1* | 7/2014 | Buck | G06F 21/50 726/26 |
| 2014/0282877 A1 | 9/2014 | Mahaffey et al. | |
| 2015/0062158 A1* | 3/2015 | Hildreth | G02B 27/0172 345/633 |
| 2015/0135298 A1* | 5/2015 | Robison | G06F 21/31 726/10 |
| 2015/0156171 A1* | 6/2015 | Biswas | H04L 63/04 726/26 |
| 2015/0207820 A1* | 7/2015 | Klug | H04L 63/20 726/1 |
| 2015/0264573 A1* | 9/2015 | Giordano | H04L 63/08 726/7 |
| 2015/0302207 A1* | 10/2015 | Sprenger | G06F 11/30 726/26 |
| 2016/0063660 A1* | 3/2016 | Spector | G06T 1/0021 382/100 |
| 2016/0070344 A1* | 3/2016 | Gohl | G06F 3/013 345/156 |
| 2016/0248809 A1* | 8/2016 | Smith | H04L 63/0435 |
| 2016/0300070 A1* | 10/2016 | Durham | G06F 21/6209 |
| 2017/0091448 A1* | 3/2017 | Spector | G06F 21/54 |

OTHER PUBLICATIONS

Bertino, Elisa, and Michael S. Kirkpatrick. "Location-based access control systems for mobile users: concepts and research directions." Proceedings of the 4th ACM SIGSPATIAL International Workshop on Security and Privacy in GIS and LBS. pp. 49-52. ACM, 2011.*

* cited by examiner

PROXIMITY BASED CONTENT SECURITY

BACKGROUND

The present disclosure relates to data security, and more specifically, to methods, systems and computer program products for proximity based content security.

In today's security conscious world, it is important to secure sensitive data from potential prying eyes or intruders. With frequent business travel and flexibility to work outside of traditional offices, imposing restrictions on the access of documents is a challenge.

Content security helps protect the dissemination of sensitive content to unauthorized individuals. Content security is important for confidential documents for corporate executives as well as senior leaders while in public areas like office conference rooms, airports, etc. For example, an organization might want to secure a document in a manner that would prevent reading it in the presence of any unauthorized person, or read only when within a restricted boundary, e.g. within the organization's premises only.

SUMMARY

Embodiments include a computer system for proximity based content security, the computer system including a proximity based content security server having a process, the processor configured to perform a method. The method includes receiving a request to access a secured data by a user device; accessing, by a processor, a security profile for the secured data; obtaining environmental data from one or more sensors related to the user device, wherein a type of the one or more sensors is determined by the security profile; and providing access to the secured data based upon a determination that the environmental data is in compliance with the security profile.

Embodiments also include a computer program product for proximity based content security, the computer program product including a non-transitory computer readable storage medium having computer readable program code embodied therewith. The computer readable program code including computer readable program code configured to perform a method. The method includes receiving a request to access a secured data by a user device; accessing, by a processor, a security profile for the secured data; obtaining environmental data from one or more sensors related to the user device, wherein a type of the one or more sensors is determined by the security profile; and providing access to the secured data based upon a determination that the environmental data is in compliance with the security profile.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for proximity based content security are provided. In exemplary embodiments, proximity based content security includes requesting access to secure data by a user device and receiving a security profile related to the requested secure data. Access to the secured data is based upon the security profile and environment conditions surrounding a user device, which are detected by one or more sensors. Based upon these environmental conditions as they relate to the security profile of the secured data, security measures can be invoked to maintain the security of this secure data. For example, if a company employee is requesting access to a secure document from his or her laptop, a security profile related to that secure document will be retrieved. Based upon the security profile, environmental conditions, such as physical location of the laptop (i.e. is it on the company's premises), will be obtained and if the environmental conditions of the laptop are in compliance with the security profile of the secure document, access will be granted. If not, access will be denied. Once access is granted and upon a violation of the security profile, a security measure can be invoked.

Figure 1:
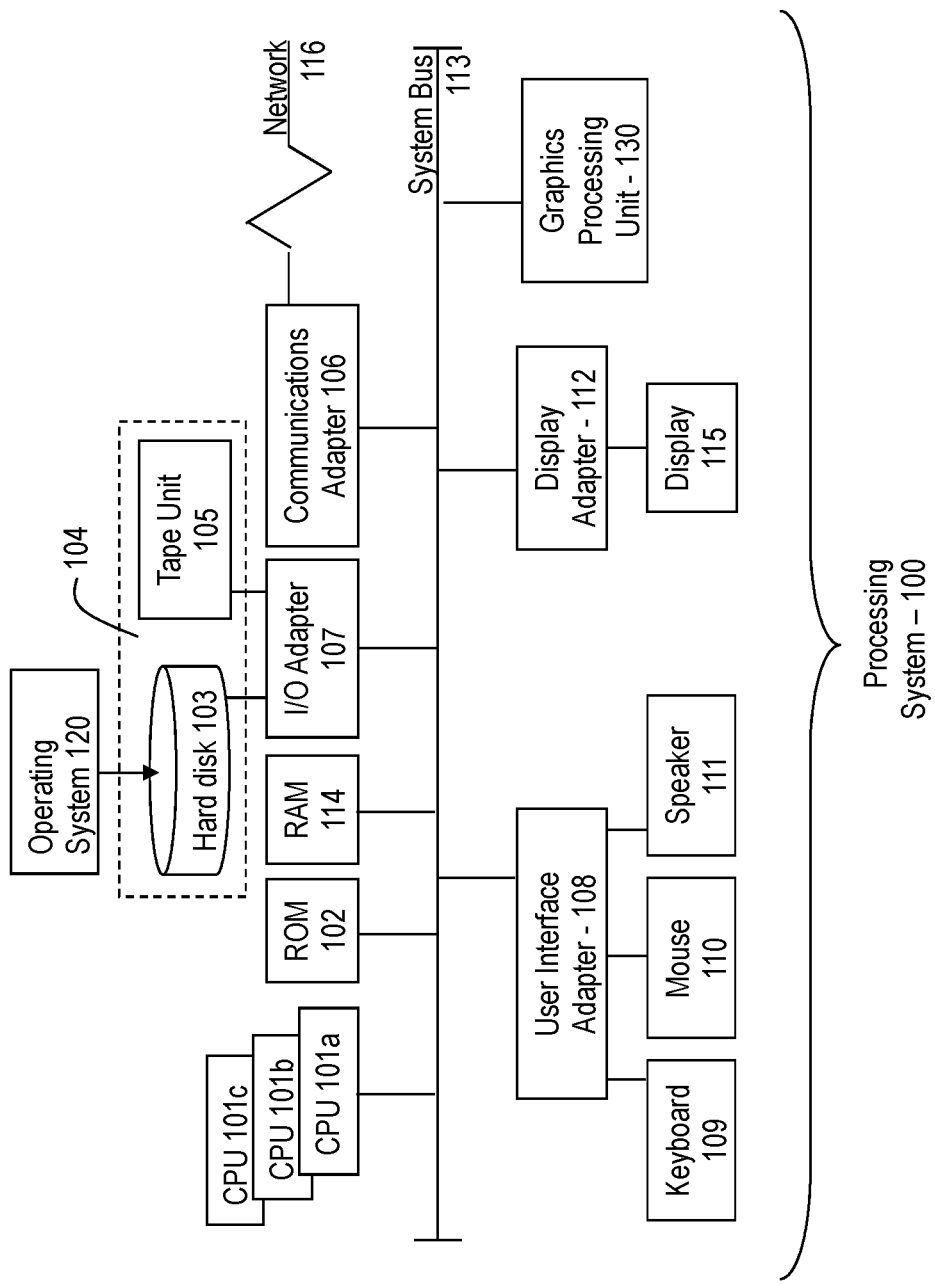
FIG. 1 illustrates a block diagram of a computer system for use in practicing the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Figure 2:
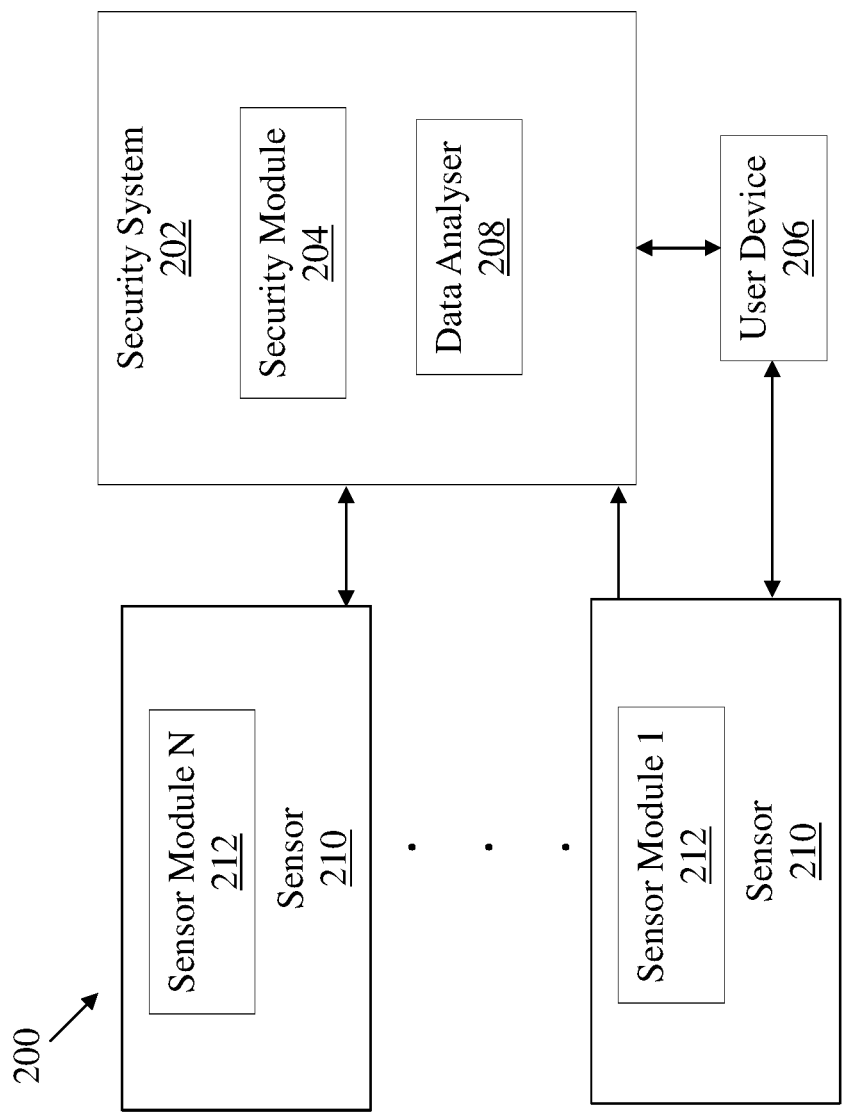
FIG. 2 illustrates a block diagram of a system for content security including proximity based content security in accordance with an embodiment.

FIG. 2 is a block diagram illustrating a proximity based content security system 200 according to an embodiment. As shown in FIG. 2, the system 200 includes a user device 206 which can include a personal computer (PC), laptop computer, smart phone, personal digital assistant (PDA) device, tablet, or the like. The system 200 also includes a security system 202 which contains a security module 204 and data analyzer 208. A number of sensors 210 are in communication with the security system 202 and include a sensor module 212 for each sensor 210. The sensor module 212 may include a transceiver to communicate sensor data to the security system 202. In an embodiment, the user device 206 communicates with the security system 202 which can be hosted locally on the user device 206 or hosted on a server, hosted in the cloud, or the like. The sensors 210 may be physically attached to, or embedded in, the user device 206 and/or the sensors 210 may be separate from the user device 206. For example, a user device 206 such as a laptop may have an embedded camera housed inside the laptop frame which can serve as a sensor 210. Or the laptop could be wirelessly connected to a standalone webcam or other device, such as a mobile phone. The sensors 210 are in communication with the security system 202. For example, a company may have security cameras or motion sensors that may be connected to the security system 202 and this sensor data may be transmitted directly to the security system 202. In addition, based upon sensor data received by the security system 202, the security system 202 may access sensors 210 that are in proximity to the user device 206. For example, if a user of a laptop computer is within the boundaries of the user's company, the security system 202 may use the location to access additional sensors 210 near to the user device 206, such as a camera or motion sensor.

In exemplary embodiments, the security system 202 may be a processing system similar to the one described above with reference to FIG. 1. The security system 202 includes a security module 204 that is configured to communicate with a user device 206 as well as various sensors 210. Additionally, the security system 202 includes a data analyzer 208 that is configured to receive and analyze data from a sensor module 212 within the sensors 210 to determine a host of information such as authentication of a user, the proximity of individuals besides the user, the location of the user device within a geographical area, the authentication of individuals other than the user, etc. The security system 202 may interact with various sensors 210 which may be connected to or embedded in the user device 206 or may communicate with the security system 202 via a local or wide area network connection. The sensors 210 may be connected to the user device 206 though a plurality of connections which include but are not limited to a wired connection or a wireless connection. For example, a sensor 210 may be embedded within the webcam of a laptop computer. Or, a sensor 210 may be in electronic communication with the user device 206 as discussed above. Also, a sensor 210 may not be in electronic communication with the user device 206 and may be operated on a cellular or Wi-Fi network. For example, a camera may be in the same room as the user device 206, but it may be connected to the security system 202 via its own Wi-Fi hardware or cellular data hardware within the camera itself and not in electronic communication with the user device 206. Each sensor 210 contains a sensor module 212 which may communicate sensor data to the security system 202. The security system 202 may be implemented locally on the user device 206 or may be housed on a server which contains confidential data such as a lightweight directory access protocol (LDAP) server. The sensors 210 may be implemented on any type of device including a processing system 100 described in FIG. 1.

The security module 204 may be configured to receive various types of sensor data including but not limited to optical data, motion activation data, sound data, proximity data, global positioning data, accelerometer data, infrared data, barcode data, RSID data, etc. The sensor data may be communicated to the security system 202 via the sensor module 212. After receiving the sensor data, the data analyzer 208 may analyze the sensor data to determine a security measure. To carry out the security measure, the security module 204 may communicate with the user device 206 with the course of action.

Figure 3:
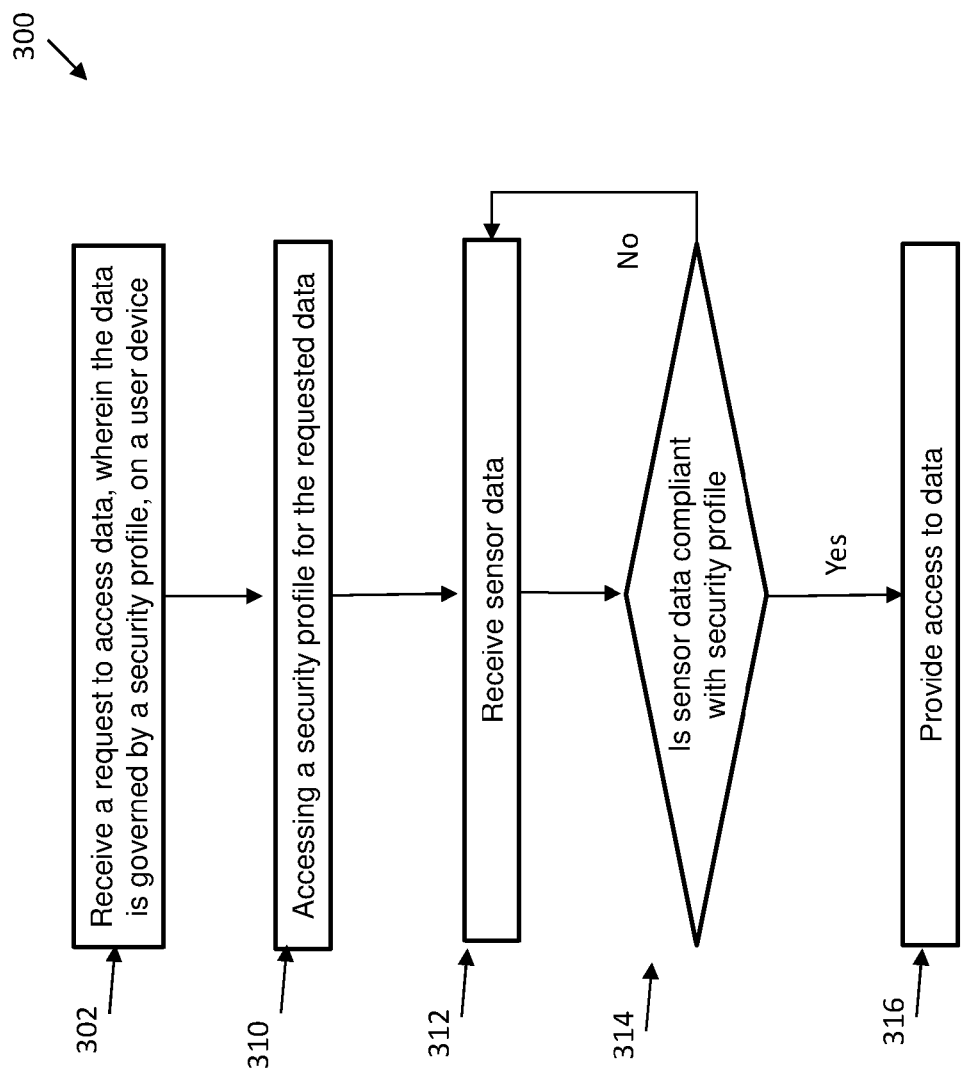
FIG. 3 illustrates a flow diagram of a method for providing content security system in accordance with an embodiment.

Referring now to FIG. 3, a flow diagram of a method 300 for proximity based content security in accordance with an exemplary embodiment is shown. As shown at block 302, the method 300 includes receiving a request to access data, wherein the data is governed by a security profile. In exemplary embodiments, the security profile of the data contains information on access rights for the data. The access rights may include an authorized user list, a location dependent access restriction, and restrictions on certain parts of the data for use by only certain individuals or viewing within a certain boundary or the like. The method 300 also includes accessing a security profile for the requested data, as shown in block 310. Next, as shown in block 312, the method 300 also includes receiving sensor data. Next, as shown in decision block 314, the method 300 decides if the sensor data is compliant with the security profile of the accessed data. If the sensor data is compliant with the security profile, the method 300 provides access to the data, as shown at block 316. If the sensor data is not compliant with the security profile, the method 300 continues to receive sensor data, as shown in block 312. Sensor data may also be continuously or periodically received to determine if a security measure needs to be implemented at a later time.

Referring back to FIG. 2, in an exemplary embodiment, the security profile may determine a type of sensor 210 that will be accessed or required by the security system 202. For example, if the security profile has a proximity based requirement, then the security system may access GPS location type sensors related to the user device 206. The type of sensors 210 accessed by the security system 202 are determined by the security profile and include location type sensors for determining the location of the user device 206, individuals proximity sensors, such as motion sensors, that can show the location of individuals that may not have authorization to view the secured data, and authentication sensors such as facial recognition, mobile/wearable devices that communicate with sensors 210 to authenticate the individual and the like.

In exemplary embodiments, the sensor data being received can be a host of data types including but not limited to motion sensor data, facial recognition sensor data, MAC Address data, GPS location sensor data, Bluetooth® sensor data, proximity sensor data, camera data, infrared sensor data and the like.

In an exemplary embodiment, the security module 204 may be configured to perform authentication of a user. Authentication of a user can include the use of sensors 210 such as a camera, motion sensor, proximity sensor, biometric sensor, etc. In an exemplary embodiment, a camera attached to the user device 206 may be used to capture an image that can be used for facial recognition of a user before allowing access to confidential data. A user with a certain clearance level may only access data found in, for example, a confidential document. The user's facial features may be saved and authenticated prior to allowing access to a confidential document being accessed. In addition, a user attempting to access a confidential document may use a mobile or wearable device which provides biometric authentication for access. A mobile or wearable device may include a cell phone, an RSA SecureID device, a GPS device, or the like. The mobile or wearable device may communicate with sensors attached to the user device to provide authentication information prior to allowing access to confidential data. Confidential data may include documents, programs, directories, applications, images, diagrams, emails, and the like.

Figure 4A:
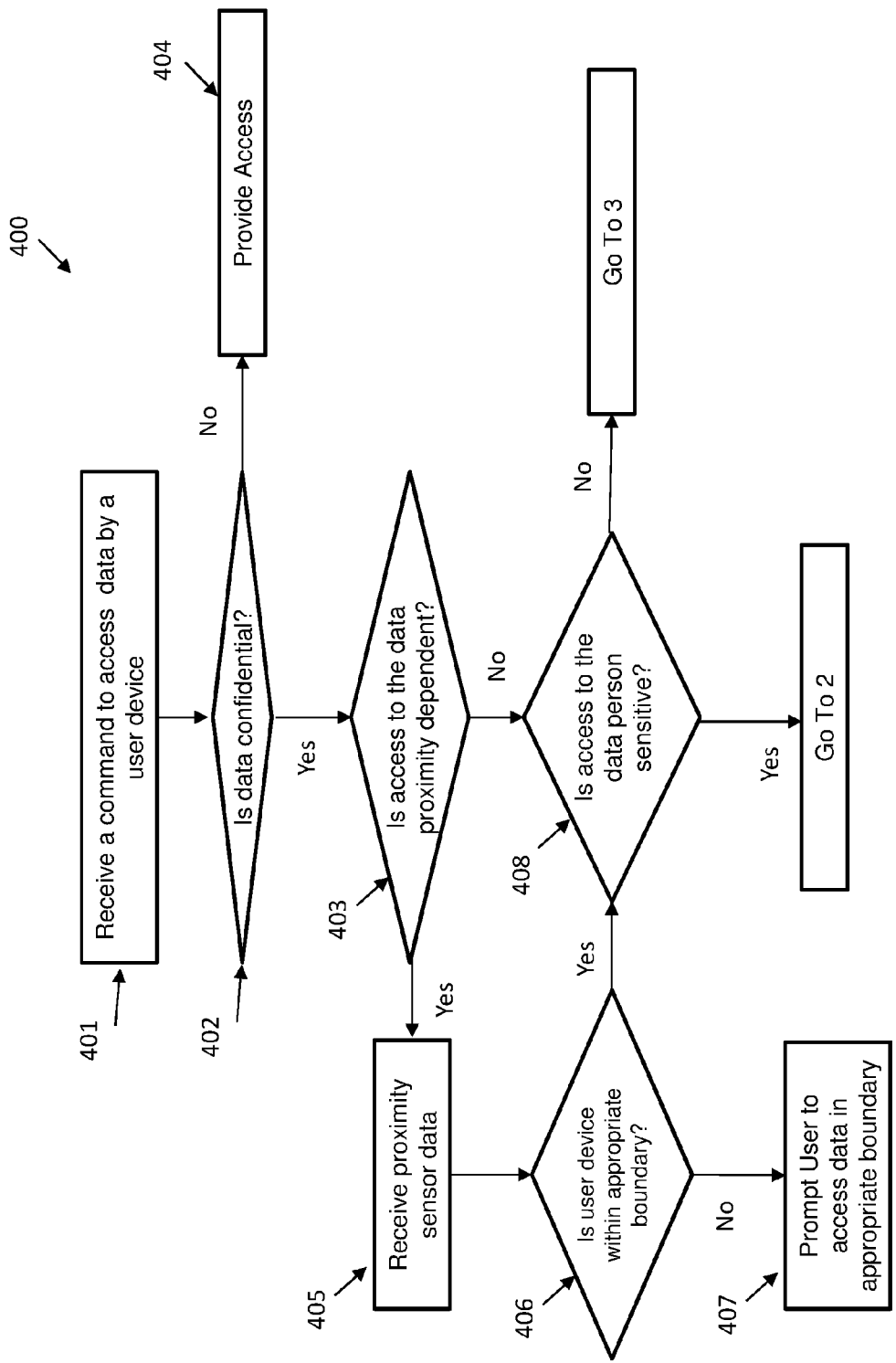
FIGS. 4A and 4B illustrate a flow diagram of a method for proximity based content security in accordance with an embodiment.

Referring now to FIG. 4A, a flow diagram of a method 400 for proximity based content security in accordance with an exemplary embodiment is shown. As shown at block 401, the method 400 includes receiving a request to access data by a user device. Next, as shown at block 402, the method 400 includes making a determination as to whether the requested data is confidential. Should the data not be deemed confidential, access to the data is provided, as shown at block 404. However, if the data is confidential, the method 400 proceeds to block 403 and determines if access to the data is proximity dependent. If the data access is proximity dependent, the method 400 will receive sensor data related to proximity of the user device as shown in box 405. A determination is made as to whether the user device within an appropriate boundary as shown in box 406. If the user device is not within an appropriate boundary, the method 400 will prompt the user to access the data within an appropriate boundary 407 and the user will be unable to access the data. If the user device is within an appropriate boundary, a determination will then be made as to whether the data is person sensitive, as shown in block 408.

Figure 4B:
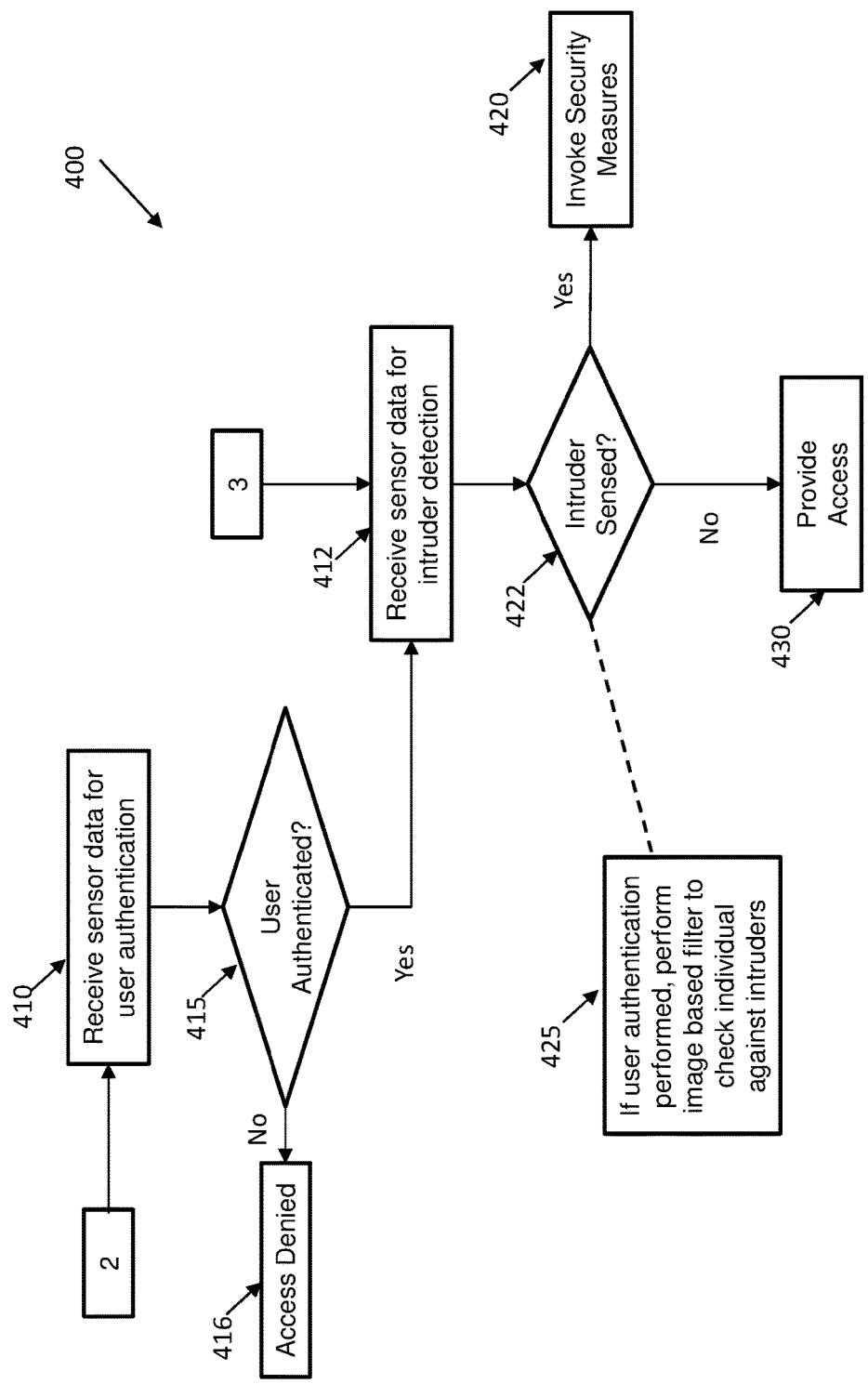

Referring now to FIG. 4B, a continuation of the flow diagram of a method 400 for proximity based content security in accordance with an exemplary embodiment is shown. As shown at block 410, user authentication sensor data is received. Next at block 415, authentication of the user is determined. If the user is not authenticated, access is denied to the data or content 416. Should the user be authenticated, the method then received sensor data related to intruder detection 412. A determination is made as to whether an intruder is sensed near the user device 422. If an intruder is sensed 420, security measures may be invoked. Some exemplary security measures that may be invoked are the screen going to a screen saver, the screen going into a blank mode, specific, sensitive portions of the data may be merged into the background color to ensure the data is no visible to an intruder, an application displaying the data may be closed, all of the data may be blanked, the sensitive data may be removed from the screen temporarily, access to the sensitive data may be denied entirely, and a host of other security measures ensuring an intruder does not have access to sensitive data. For example, if a user device is accessing sensitive or secured data which has a security profile that requires the user device be located within a certain boundary, a security measure may be to deny access should the user device leave the boundary. In another example, if an intruder is sensed, the method may perform additional authentication of the "intruder" to determine the "intruder" is not the authenticated user that originally accessed the data 425. If no intruder is sensed, access to the data 430 is provided.

In exemplary embodiments, a user may access sensitive data (which by example may be a confidential document) via a user device 206. Before loading this confidential document, the security system will check the security profile of the document to see if it has a proximity-based security protocol in place. If a proximity protocol is in place, the security system will access certain types of sensors that supply proximity based sensor data to determine via the security module 204 and data analyzer 208 if the user device is within an appropriate boundary. If the user device is not within the appropriate boundary, then access to the confidential document is denied. Should the confidential document not have a security profile showing a proximity based requirement or if the user device is within an appropriate boundary according to the sensor data, the security system will then look to other types of sensors, according to the security profile, selected from a host of available sensors. The available sensors may include a camera that can employ facial recognition to determine if the user accessing the confidential document possesses the appropriate security clearance to access the confidential document. This facial recognition camera may also look to other individuals near the user device to determine if the other individuals possess security clearance to view the confidential documents. If the camera observes an individual that does not have the security clearance and is near by the user device, the security system will then invoke a security measure. Security measures can include but are not limited to blanking the entire screen, blanking only a portion of the confidential document, invoking a screen saver, or closing or minimizing the program displaying the confidential document.

In exemplary embodiments, the security profile of secured data may be created, modified, and deleted by a user of the user device 206. For example, if a user is accessing a document and makes changes to the document to where the content is no longer considered confidential or secure, the user may change the security profile to reflect these changes or even delete the security profile. In the alternative, the user may update the security profile to include additional security measure should the data be deemed secure either via an edit to the data or should the user decide the data is confidential.

The security system may receive sensor data periodically from available sensors. For example, based upon the security profile of the data, a sensor 210 may be required to send sensor data periodically in which the period can be set at every 1 second, 5 seconds, 10 minutes or any amount of time as defined by the security profile. Motion sensors may be employed to pick up movement near a user device to determine if a security measure needs to be invoked. The motion sensors may recognize patterns in movement to avoid invoking a security measure when it is unnecessary. In an exemplary embodiment, a user may be working on a confidential document at a park where there are a number of other individuals without security clearance that are passing by, either walking or jogging. The motion sensor may recognize the pattern of walking or jogging by and not invoke a security measure based upon this type of pattern recognition. Or in contrast, if an individual lingers for a time longer than normal, a security measure may be invoked.

In an exemplary embodiment, a user may possess a wearable/mobile device that connects to a server, such as an LDAP server, which provides for authentication of a user and supplies authorization information for the type of data the user may access. The wearable/mobile device may provide credential information to the server to allow that user to access appropriate data on the server from his or her user device. Additionally, the wearable/mobile device may provide credential information to the server for when the individual using the wearable/mobile device is near by a user device being utilized by another individual. The user device being utilized by another individual may or may not invoke a security measure based upon the credential information detected from the wearable/mobile device.

In exemplary embodiments, the sensitive or confidential data may be in the form of a document. Depending on the portion of the document being accessed, the security measures being employed would vary based upon the sensor data received. For example, the front page of a document may have a lower security level than later pages that may contain figures or graphs or even financial information. Should an individual access the document via a user device outside an appropriate boundary as mentioned above, only portions of the document would be available to view based upon the security level of the portions of the document. Additionally, based upon the security authorization level of an individual accessing the document, portions of the confidential document may be viewed (portions commensurate with the user's security clearance) while the higher security portions may be merged into the background color and not viewable by the individual with a low security clearance.

In exemplary embodiments, the security system 202 may utilize a GUI based apparatus to set up security privileges in a document or other secure data using a server such as an enterprise LDAP. The GUI would allow an individual to set up security on specific sensitive contents within a document or other data which pertains to a specific group or individual within an enterprise LDAP.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for proximity based content security, the method comprising:
    receiving a request to access a secured data by a user device;
    accessing, by a processor, a security profile for the secured data;
    obtaining environmental data from one or more sensors related to the user device, wherein a type of the one or more sensors is defined by the security profile;
    providing access to the secured data based upon a determination that the environmental data is in compliance with the security profile;
    periodically obtaining the environmental data from the type of one or more sensors while the secured data is being accessed;
    invoking a security measure based upon a determination that the environmental data is not in compliance with the security profile, wherein the display screen displays the secured data and unsecured data, and wherein the secured data is displayed on a portion of the display screen;
    blanking the portion of the display screen displaying the secured data;
    receiving an edit to a portion of the secured data; and
    removing the security profile for the secured data based at least in part on the edit to the portion of the secured data.

2. The computer-implemented method according to claim 1, wherein the one or more sensors comprise at least one of a camera, a motion sensor, and a proximity sensor.

3. The computer-implemented method according to claim 1, wherein the one or more sensors are located physically separate from the user device.

4. The computer-implemented method according to claim 1, wherein the security measure comprises at least one of invoking a screen saver for a display screen of the user device, blanking a display screen of the user device, closing the secured data, blanking a portion of the secured data, turning off the display screen of the user device, and denying access to the secured data.

5. The computer-implemented method according to claim 1, wherein a period of the periodically obtaining the environmental data is determined by the security profile.

6. The computer-implemented method according to claim 1, wherein the environmental data comprises at least one of a location of the user device, a proximity of an individual other than a user of the user device to the user device, an identity of the user of the user device, and an identify of an individual other than the user of the user device.

7. The computer-implemented method according to claim 6, wherein the identity is determined by at least one of a facial recognition, a mobile device, and a wearable device.

8. A system for proximity based content security, the system comprising:
    a processor communicatively coupled to a memory, the processor configured to:
        receive a request to access a secured data by a user device;
        access a security profile for the secured data;
        obtain environmental data from one or more sensors related to the user device, wherein a type of the one or more sensors is defined by the security profile;
        provide access to the secured data based upon a determination that the environmental data is in compliance with the security profile;
        periodically obtain the environmental data from the type of one or more sensors while the secured data is being accessed;
        invoke a security measure based upon a determination that the environmental data is not in compliance with the security profile, wherein the display screen displays the secured data and unsecured data, and wherein the secured data is displayed on a portion of the display screen;
        blank the portion of the display screen displaying the secured data;
        receive an edit to a portion of the secured data; and
        removing the security profile for the secured data based at least in part on the edit to the portion of the secured data.

9. The system according to claim 8, wherein the one or more sensors comprise at least one of a camera, a motion sensor, and a proximity sensor.

10. The system according to claim 8, wherein the one or more sensors are located physically separate from the user device.

11. The system according to claim 8, wherein the security measure comprises at least one of invoking a screen saver for a display screen of the user device, blanking a display screen of the user device, blanking the secured data, closing the secured data, blanking a portion of the secured data, turning off the display screen of the user device, and denying access to the secured data.

12. The system according to claim 8, wherein a period of the periodically obtaining the environmental data is determined by the security profile.

13. The system according to claim 8, wherein the environmental data comprises at least one of a location of the user device, a proximity of an individual other than a user of the user device to the user device, an identity of the user of the user device, and an identify of an individual other than the user of the user device.

14. The system according to claim 13, wherein the identity is determined by at least one of a facial recognition, a mobile device, and a wearable device.

15. A computer program product for proximity based content security, the computer program product comprising:
   a non-transitory, tangible storage medium readable by a processing circuit and storing instructions for execution by the processing circuit for performing a method comprising:
      receiving a request to access a secured data by a user device;
      accessing, by a processor, a security profile for the secured data;
      obtaining environmental data from one or more sensors related to the user device, wherein a type of the one or more sensors is determined defined by the security profile;
      providing access to the secured data based upon a determination that the environmental data is in compliance with the security profile;
      periodically obtaining the environmental data from the type of the one or more sensors while the secured data is being accessed;
      invoking a security measure based upon a determination that the environmental data is not in compliance with the security profile, wherein the display screen displays the secured data and unsecured data, and wherein the secured data is displayed on a portion of the display screen;
      blanking the portion of the display screen displaying the secured data;
      receiving an edit to a portion of the secured data; and
      removing the security profile for the secured data based at least in part on the edit to the portion of the secured data.

16. The computer program product of claim 15, wherein the security measure comprises at least one of invoking a screen saver for a display screen of the user device, blanking a display screen of the user device, blanking the secured data, closing the secured data, blanking a portion of the secured data, turning off the display screen of the user device, and denying access to the secured data.

17. The computer program product of claim 15, wherein a period of the periodically obtaining the environmental data is determined by the security profile.

* * * * *